US00RE37221E

(19) United States
(12) Reissued Patent
Bowman et al.

(10) Patent Number: US RE37,221 E
(45) Date of Reissued Patent: Jun. 12, 2001

(54) POWER CONVERTER ADAPTIVELY DRIVEN

(75) Inventors: Wayne C. Bowman, Allen; Van A. Niemela, Dallas, both of TX (US)

(73) Assignee: Lucent Technologies Inc., Murray Hill, NJ (US)

(21) Appl. No.: 09/553,746

(22) Filed: Apr. 20, 2000

Related U.S. Patent Documents

Reissue of:
(64) Patent No.: 5,742,491
Issued: Apr. 21, 1998
Appl. No.: 08/513,198
Filed: Aug. 9, 1995

(51) Int. Cl.[7] ..... H02M 3/335
(52) U.S. Cl. ..... 363/21.06; 363/89; 363/127; 363/21.09
(58) Field of Search ..... 363/15, 16, 21, 363/89, 125, 127

(56) References Cited

U.S. PATENT DOCUMENTS 4,356,541 * 10/1982 Ikenoue et al. ..... 363/127
4,399,499 * 8/1983 Butcher et al. ..... 363/127
4,870,555 * 9/1989 White ..... 363/127
5,255,174 * 10/1993 Murugan ..... 363/127
5,303,138 * 4/1994 Rozman ..... 363/21
5,321,596 * 6/1994 Hurst ..... 363/127
5,402,480 * 3/1995 Hirahara ..... 363/89
5,424,932 * 6/1995 Inov et al. ..... 363/89

* cited by examiner

*Primary Examiner*—Jeffrey Sterrett

(57) ABSTRACT

A drive circuit for a converter and a method of driving a converter. The converter includes an inverter and a synchronous rectifier. The drive circuit includes: (1) a modulation circuit for generating a drive waveform for controlling the inverter and the synchronous rectifier employing a negative feedback loop, (2) a modification circuit, coupled to the modulation circuit, for sensing an operating condition of the converter and shifting a portion of the drive waveform as a function of the operating condition, the modification circuit thereby creating a variable drive waveform from the drive waveform without employing negative feedback and (3) a transmission circuit, coupled to the modification circuit, for applying the variable drive waveform to the converter, thereby allowing a variable nonconcurrent change in state of the inverter and the synchronous rectifier according to the function of the operating condition.

89 Claims, 8 Drawing Sheets

PRIOR ART ----------

PRINCIPLES OF PRESENT INVENTION ————

PRIOR ART ----------

PRINCIPLES OF PRESENT INVENTION ————

PRIOR ART ----------

PRINCIPLES OF PRESENT INVENTION ————

PRIOR ART ----------

PRINCIPLES OF PRESENT INVENTION ————

PRIOR ART ----------

PRINCIPLES OF PRESENT INVENTION ————

POWER CONVERTER ADAPTIVELY DRIVEN

Matter enclosed in heavy brackets [ ] appears in the original patent but forms no part of this reissue specification; matter printed in italics indicates the additions made by reissue.

TECHNICAL FIELD OF THE INVENTION

The present invention is directed, in general, to converters employing synchronous rectifiers and, more specifically, to an inverter/control-driven synchronous rectifier wherein the delay between drive waveforms for the inverter and synchronous rectifier is not static, but rather is varied as a function of a selected operating condition of the converter.

BACKGROUND OF THE INVENTION

A power converter is a power processing circuit that converts an input voltage waveform into a specified output voltage waveform. In many applications requiring a DC output, switched-mode DC/DC converters are frequently employed to advantage. DC/DC converters generally include an inverter circuit, an input/output isolation transformer and a rectifier on a secondary side of the isolation transformer. The rectifier within the converter generates a DC voltage at the output of the converter. Conventionally, the rectifier comprises a plurality of rectifying diodes that conduct the load current only when forward-biased in response to the input waveform to the rectifier. However, diodes produce a voltage drop thereacross when forward-biased. Given an escalating requirement for a more compact converter that delivers a lower output voltage (i.e. 3.3 V for a central processing unit, or "CPU," of a computer), it is highly desirable to avoid the voltage drop inherent in the rectifying diodes and thereby increase the efficiency of the converter.

A more efficient rectifier can be attained in converters by replacing the rectifying diodes with active switches, such as field effect transistors ("FETs"). The switches are periodically toggled between conduction and nonconduction modes in synchronization with the periodic waveform to be rectified. A rectifier employing active switches is conventionally referred to as a synchronous rectifier.

There are two classes of synchronous rectifiers. The first class of synchronous rectifier is conventionally referred to as "self-driven" synchronous rectifiers. Self-driven synchronous rectifiers presently enjoy widespread acceptance in power converters. In self-driven synchronous rectifiers, the biasing drive signals that control the synchronous rectifier switches are directly produced from the naturally-present voltages in the output circuit of the converter. The second class of synchronous rectifier is conventionally referred to as a "control-driven" synchronous rectifier. Contrary to self-driven synchronous rectifiers, the biasing drive signals that control the synchronous rectifier switches are produced by a regulation control circuit that determines the biasing of the main power switch or switches that constitute the inverter portion of the converter. Currently, control-driven synchronous rectifiers are not as widely used as self-driven synchronous rectifiers because of the additional regulation control circuitry required to drive the synchronous rectifiers. Also, maintaining the proper timing of the rectifier drive signals relative to the inverter drive signals can be difficult, thereby hindering the use of control-driven synchronous rectifiers.

However, control-driven synchronous rectifiers enjoy some distinct advantages over self-driven synchronous rectifiers. First, since the drive signals of the self-driven synchronous rectifier are produced by the naturally-present voltages in the output circuit of the converter, the amplitude of the drive signals to the synchronous rectifier are frequently of insufficient magnitude, thereby resulting in poor rectification of the resulting output voltage signal.

Second, since the drive signals of the self-driven synchronous rectifier are generated by the switching action of the inverter, there is limited latitude to advance the timing of the drive signals for the synchronous rectifier relative to the drive signals of the inverter. This limitation is especially disadvantageous when the operating conditions of the power converter vary over wide ranges. For example, during "partial" load or no-load operating conditions, the losses in some power-converter designs are excessive because the driven signals for the self-driven synchronous rectifier cannot be independently timed to drive the synchronous-rectifier switches at their most efficient point.

Therefore, control-driven synchronous rectifiers provide both controllable-amplitude drive signals and, with the use of delay circuits, completely flexible drive timing for the synchronous rectifier switches. While conventional control-driven synchronous rectifiers provide a mechanism to set a relative timing different of the drive signals with respect to one another, there is an additional concern that must be addressed.

In such control-driven synchronous rectifiers, the relative timing of the drive signals to the synchronous rectifier and the main power switches is fixed to maximize efficiency while keeping the stresses on individual components within acceptable limits. In some ways, however, the optimum drive timing for one set of operating conditions is different from the optimum drive timing for another set of operating conditions. For instance, a synchronous rectifier drive timing that produces maximum efficiency at a first load condition may produce excessive voltage stress on the rectifier switch at a second, lesser load condition. Conversely, when the timing is changed to lower the voltage stress at the second load condition, a loss of efficiency is liable to occur at the first load condition.

Accordingly, what is needed in the art is a drive circuit for a converter employing an inverter and a synchronous rectifier that adapts the delay between the drive waveforms supplied to the inverter and synchronous rectifier as a function of an operating condition of the converter to allow the converter to operate efficiently over a far wider range of operating conditions.

SUMMARY OF THE INVENTION

To address the above-discussed deficiencies of the prior art, the present invention provides a drive circuit for a converter and a method of driving a converter. The converter includes an inverter and a synchronous rectifier. The drive circuit includes: (1) a modulation circuit for generating a drive waveform for controlling the inverter and the synchronous rectifier employing a negative feedback loop, (2) a modification circuit, coupled to the modulation circuit, for sensing an operating condition of the converter and shifting a portion of the drive waveform as a function of the operating condition, the modification circuit thereby creating a variable drive waveform from the drive waveform without employing negative feedback and (3) a [mission] *transmission* circuit, coupled to the modification circuit, for applying the variable drive waveform to the converter, thereby allowing a variable nonconcurrent change in state of the inverter and the synchronous rectifier according to the function of the operating condition.

Thus, the present invention recognizes that the delay introduced in the drive waveform between the inverter and synchronous rectifier should not be static, but rather be varied as a function of a selected operating condition of the converter. This allows the converter to operate efficiently over a broad range of conditions, rather than optimally only under one particular condition.

In a preferred embodiment of the present invention, the modification circuit delays a portion of the drive waveform (or signal transition of the drive waveform) to produce the variable drive waveform. Alternatively, the subject signal transition can be advanced relative to other signal transitions by delaying those other signal transitions.

In a preferred embodiment of the present invention, the operating condition is an output current level of the converter. This is not the only operating condition that can be sensed, however. In some applications, converter input voltage or current level or output voltage level may be sensed. In addition, other factors, such as temperature, may be detected. Further, the present invention contemplates the sensing of more than one operating condition.

In a preferred embodiment of the present invention, the drive circuit further includes another transmission circuit and the modification circuit creates a fixed drive waveform, the another transmission circuit applies the fixed drive waveform to the inverter and the transmission circuit applies the variable drive waveform to the synchronous rectifier. Alternatively, the variable drive waveform may be applied to the inverter and the fixed drive waveform to the synchronous rectifier.

In a preferred embodiment of the present invention, the modification circuit includes a plurality of delay circuits having different delays associated therewith and a delay selection circuit adapted to act on a selected one of the plurality of delay circuits [To] *to* create the variable drive waveform. This arrangement of separate fixed-delay circuits generally results in a step function, wherein each delay circuit has a given, fixed delay and is associated with a particular range of values of the operating condition. Alternatively, the present invention contemplates a single, continuously variable delay circuit that can provide a smooth function over a greater range of operating condition values.

In a preferred embodiment of the present invention, the modification circuit increases a delay of a portion of the drive waveform as an output current level of the converter increases. Alternatively, the delay may be decreased, the signal transition advanced (as opposed to being delayed) or the advance decreased.

In a preferred embodiment of the present invention, the drive waveform is adapted to cause a switching component within the synchronous rectifier to transition from a conducting to a nonconducting state. Alternatively, the signal transition may be adapted to cause the switching component to transition from the nonconducting to the conducting state.

In a preferred embodiment of the present invention, the function of the operating condition is discontinuous. As described above, the present invention contemplates provision of either multiple fixed or a single variable delay circuit. Multiple fixed circuits generally result in a discontinuous function, as will be illustrated in greater detail.

In a preferred embodiment of the present invention, the converter includes an isolation transformer coupled between the inverter and the synchronous rectifier, the converter being an isolated, buck-derived converter. In a manner to be illustrated and described, the present invention allows a voltage across the secondary winding of the transformer to build as rapidly as possible without causing cross-conduction, or "shoot-through," in the synchronous rectifier.

In a preferred embodiment of the present invention, the modification circuit includes an RC circuit having a variable time constant associated therewith. Those of ordinary skill in the art will recognize, however, that other analog or digital delay circuits are possible and within the broad scope of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
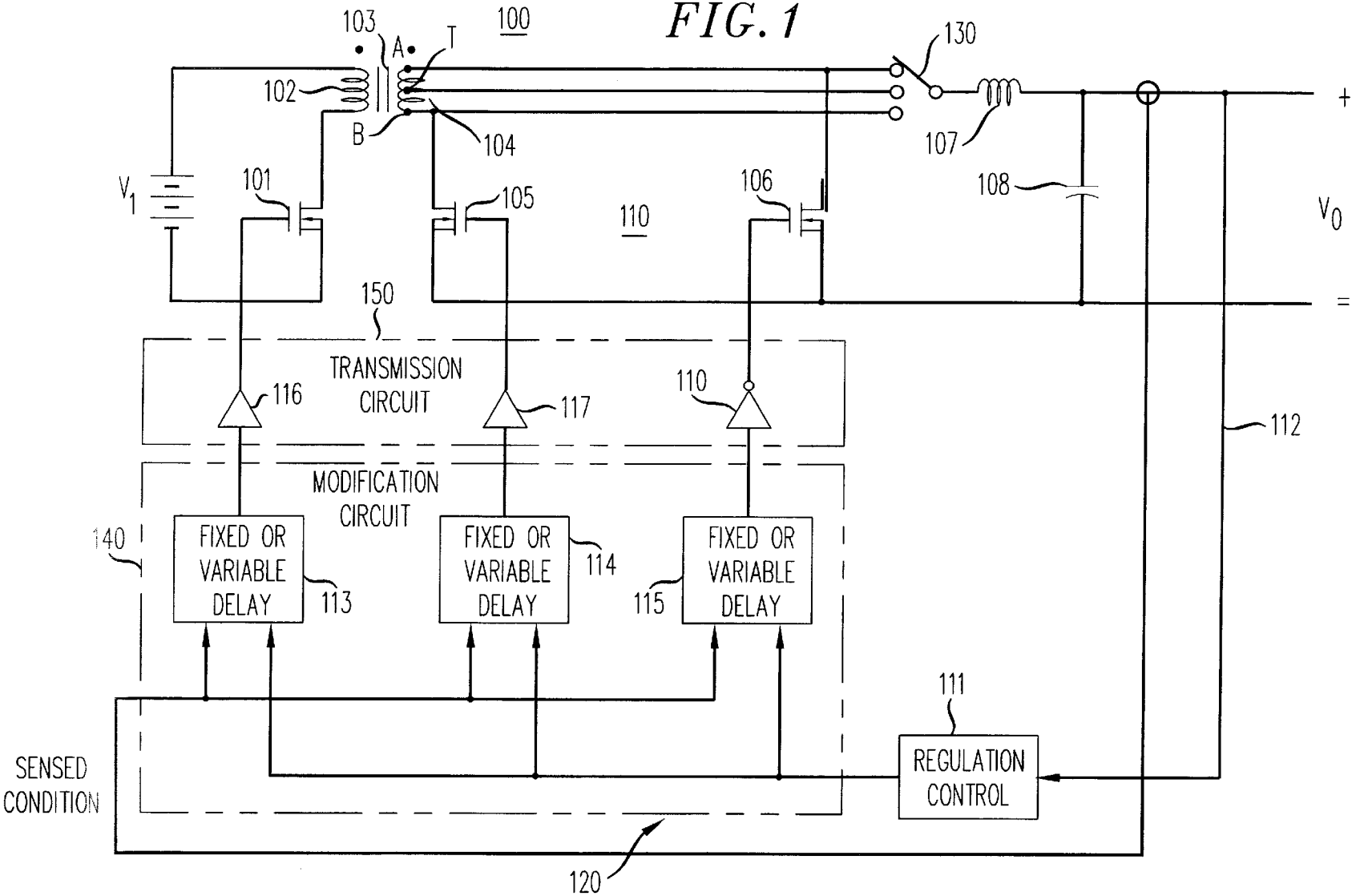
FIG. 1 illustrates a conceptual schematic diagram of a buck-derived DC/DC power converter with a control-driven synchronous rectifier employing the drive circuit of the present invention.

Referring initially to FIG. 1, illustrated is a conceptual schematic diagram of a buck-derived DC/DC power converter 100 with a control-driven synchronous rectifier 110 employing a drive circuit 120 of the present invention. The buck-derived [power] converter 100 includes an inverter comprising a main power switch FET 101 connected to and periodically switched to apply a DC input voltage $V_i$ to a primary winding 102 of a power transformer 103. The invention is independent of the means used to reset the magnetic flux in the core of the transformer 103 and any additional circuitry included to accomplish this task is not shown. Furthermore, it should be appreciated that the principles embodied in the present invention are equally applicable to other types of power magnetic devices employing synchronous rectification.

A secondary winding 104 of the [power] transformer 103 of the buck-derived converter 100 is connected to the control-driven synchronous rectifier 110 comprising a pair of power switch FETs 105, 106. The power switch FETs 105, 106 are controllably switched to rectify the periodic waveform supplied to the control-driven synchronous rectifier 110 by the secondary winding 104. A low-pass filter comprising an inductor 107 and a capacitor 108 act on the rectified waveform to supply a DC output voltage $V_o$. A lead 130 coupled to the filter circuit may be connected to a point A to produce a forward topology buck-derived converter 100; the lead 130 coupled to the filter circuit may be connected to a point B to produce a flyback topology buck-derived converter 100; the lead 130 coupled to the filter circuit may be connected to a tap T in the secondary winding 104 to produce a push-push topology buck-derived converter 100.

The drive circuit 120 comprises a regulation control circuit or modulation circuit 111 that senses the output voltage $V_o$ via a lead 112 and produces a pulse train of the proper duty ratio to regulate the output voltage $V_o$ of the buck-derived converter 100. The drive circuit 120 also comprises a plurality of delay circuits 113, 114, 115 (collectively designated a modification circuit 140) with a companion set of drive circuits or transmission circuits 116, 117, 118 (collectively designated a transmission circuit 150), respectively. The pulse train is fed to the delay circuits 113, 114, 115; the output of the delay circuits 113, 114, 115 is fed to their companion drive circuits 116, 117, 118, then, drive the power switch FETs 101, 105, 106, respectively.

To obtain proper rectification, the output of the drive circuit 118 is inverted relative to the outputs of the drive circuits 116, 117. The delay circuits 113, 114, 115 adjust the relative timing of the turn-on and turn-off of the individual power switch FETs 101, 105, 106 to maximize the efficiency of the buck-derived converter 100 while avoiding excessive stresses in the FETs 101, 105, 106. Two of the delay circuits may be omitted, however, since the broad scope of the present invention fully encompasses a converter having only one delay circuit that causes at least one of the timing delays to change in response to converter operating conditions. The need for such a timing shift is illustrated below.

Figure 2:
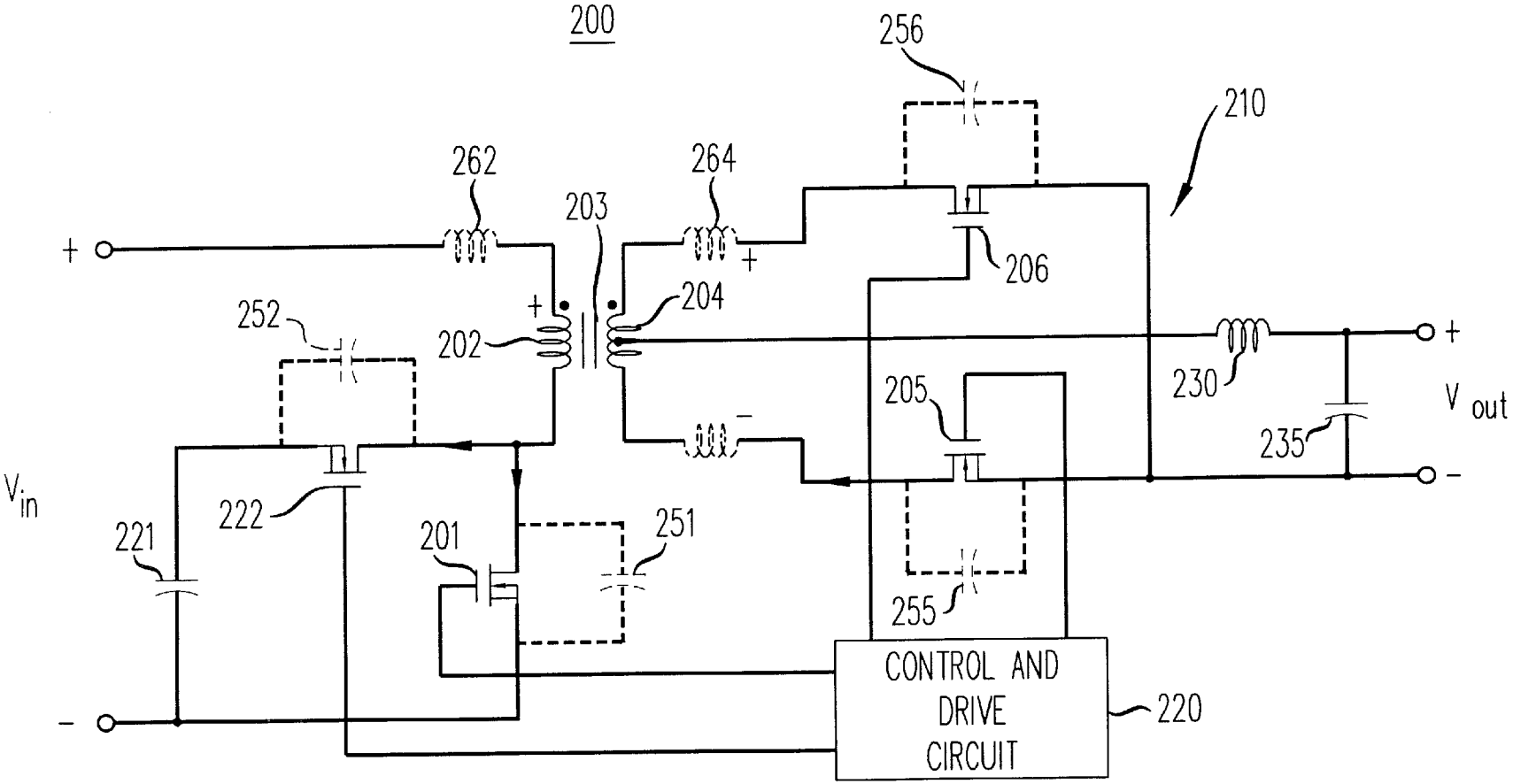
FIG. 2 (PRIOR ART)
FIG. 2 illustrates a schematic diagram of a clamp-mode push-push DC/DC power converter with a control-driven synchronous rectifier employing a prior art control and drive circuit.

Turning now to FIG. 2, illustrated is a schematic diagram of a clamp-mode push-push DC/DC power converter 200 with a control-driven synchronous rectifier 210 employing a prior art control and drive circuit 220. The clamp-mode push-push DC/DC power converter 200 is characterized by a tapped secondary winding 204 of an isolation transformer 203. Power transfers to the output of the push-push converter 200 during both the on-time and off-time of a main power switch FET 201. An active clamp, consisting of a capacitor 221 and a power switch FET 222; is included to reset the core of the transformer 203 and to maintain a voltage at a primary winding 202 of the transformer 203 when the power switch FET 201 is off. Also, an inductor 230 and a capacitor 235 provide the necessary filtering at the output of the push-push converter 200.

A pair of power switch FETs 205, 206 constitute the control-driven synchronous rectifier 210. The control-driven synchronous rectifier 210 provides an efficient means to produce a DC voltage at the output of the push-push converter 200. In essence, the control and drive circuit 220 of the prior art causes the power switch FETs 201, 205 to conduct during one portion of a switching cycle and power switch FETs 222, 206 to conduct during the remainder. The control and drive circuit 220 further introduces small timing delays during the switching transitions to optimize performance.

A DC input voltage $V_{in}$ is applied across the primary side of the transformer 203 and a DC output voltage $V_{out}$ is effected on the secondary side of the transformer 203. Furthermore, the power switch FETs 201, 222, 205, 206 are illustrated with their respective stray capacitances (denoted by dotted lines 251, 252, 255, 256) and the primary winding 202 and the secondary winding 204 of the transformer 203 are illustrated with their respective stray leakage inductances (denoted by dotted lines 262, 264). As hereinafter described, these elements are important to the operation of the push-push converter 200.

Figure 3A:
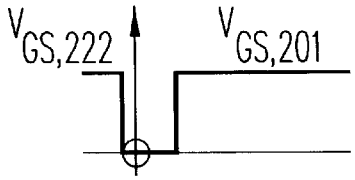
FIG. 3A (PRIOR ART)
FIGS. 3A–3E, taken in conjunction, illustrate operational diagrams of the clamp-mode push-push DC/DC power converter of FIG. 2 at full load conditions.
Figure 3B:
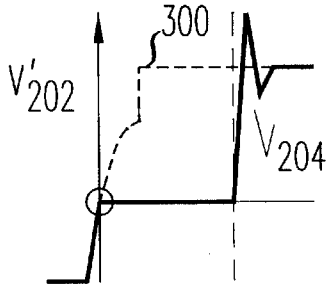
FIG. 3B (PRIOR ART)
Figure 3C:
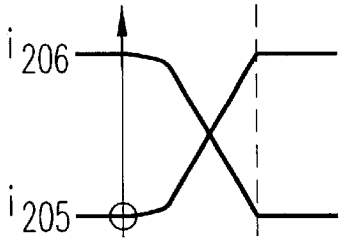
FIG. 3C (PRIOR ART)
Figure 3D:
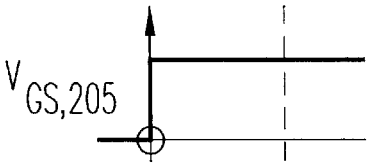
FIG. 3D (PRIOR ART)
Figure 3E:
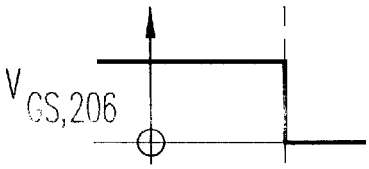
FIG. 3E (PRIOR ART)

Turning now to FIGS. 3A–3E, illustrated, in conjunction, are the operational diagrams of the clamp-mode push-push DC/DC power converter 200 of FIG. 2 at full load conditions. FIG. 3A illustrates gate-to-source voltages $V_{GS,\ 222}$, $V_{gs,\ 201}$ of the power switch FETs 222, 201, respectively. FIG. 3B illustrates a voltage $v'_{202}$ at the primary winding 202 of the transformer 203 of the push-push converter 200 multiplied by the turns ratio of the secondary winding to the primary winding ("$N_{204}/N_{202}$"); FIG. 3B further illustrates the voltage $v_{204}$ at the secondary winding 204 of the transformer 203 of the push-push converter 200. FIG. 3C illustrates currents $i_{206}$, $i_{205}$ through the power switch FETs 206, 205, respectively. Finally, FIGS. 3D and 3E illustrate gate-to-source voltages $V_{GS,\ 205}$, $V_{GS,\ 206}$ of the power switch FETS 205, 206, respectively.

With continuing reference to FIGS. 2 and 3A–3E, the full load operation of the push-push converter 200 will be described in more detail. The push-push converter 200 endeavors to optimize the drive timing of the control-driven synchronous rectifier 210. The objective is fulfilled by turning on the power switch FETs 205, 206 through their controlling gate-to-source voltages $V_{GS,\ 205}$, $V_{GS,\ 206}$ for the entire time they conduct positive current to thereby minimize the losses in the power switch FETs 205, 206. During a first time interval, the power switch FETs 222, 206 are on and the power switch FETs 201, 205 are off (as illustrated in FIGS. 3A, 3C–3E). After the power switch FET 222 is turned off, the negative voltage $v'_{202}$ at the primary winding 202 rises towards zero and eventually goes positive as the junction capacitances 251, 252 of the power switch FETs 201, 222 discharge and charge, respectively (see FIG. 3B). The power switch FET 201 is then turned on supplying the full voltage input $V_{in}$ across the primary winding 202 of the transformer 203 of the push-push converter 200.

On the secondary side of the transformer 203, the power switch FET 205 is turned on as soon as the voltage $v_{204}$ reaches zero (as illustrated in FIGS. 3B, 3D). Thereafter, until the power switch FET 206 is turned off, any positive voltage applied to the primary winding 202 (as displayed by a broken line 300 in FIG. 3B) appears across the leakage inductances 262, 264 of the transformer 203. The application of this voltage to the leakage inductances 262, 264 causes the current $i_{205}$ to rise and the current $i_{206}$ to fall resulting in an effective shift in load current between the control-driven synchronous rectifier power switch FETs 205, 206. When the current $i_{206}$ reaches zero, the power switch FET 206 is turned off and immediately blocks the voltage that formerly appeared across the leakage inductances 262, 264 of the transformer 203. The voltage $v_{204}$ (see FIG. 3B) is also the voltage across the power switch FET 206 as long as the power switch FET 206 is on. The small voltage overshoot displayed in the voltage $v_{204}$ is typically due to a ringing between the leakage inductances 262, 264 of the transformer 203 and junction capacitances 256 of the power switch FET 206.

Turning now to FIGS. 4A–4E, illustrated, in conjunction, are the operation diagrams of the clamp-mode push-push DC/DC power converter 200 of FIG. 2 at partial load conditions in comparison to the principles of the present invention. FIGS. 4A–4E display the same operational characteristics of the push-push converter 200 as illustrated in FIGS. 3A–3E, but at partial load conditions.

Figure 4A:
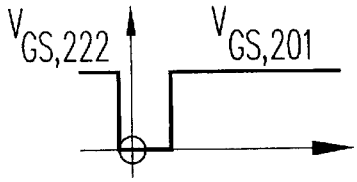
FIGS. 4A–4E, taken in conjunction, illustrate operational diagrams of the clamp-mode push-push DC/DC power converter of FIG. 2 at partial load conditions in comparison to the principles of the present invention.
Figure 4B:
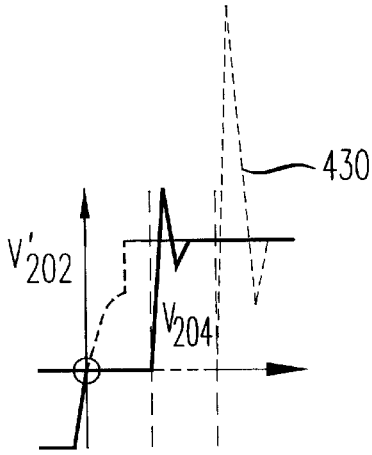
Figure 4C:
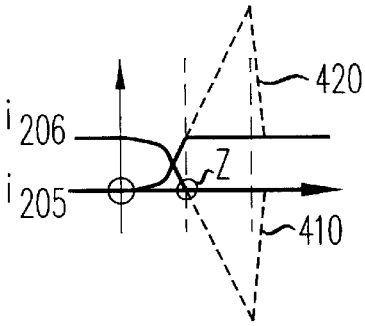
Figure 4D:
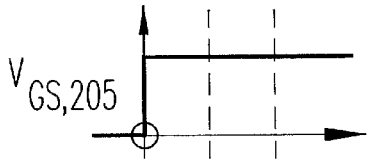
Figure 4E:
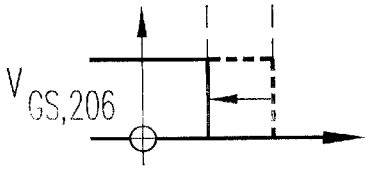

With continuing reference to FIGS. 2 and 4A–4E the partial load operation of the push-push converter 200 will be described in more detail. When the load imposed on the push-push converter 200 is reduced while the optimal full load drive timing is maintained, an undesirable condition conventionally known as "shoot-through" or "cross-conduction" occurs (the cross-conduction is represented in FIGS. 4B–4E by a plurality of dotted lines 410, 420, 430). As illustrated in FIG. 4C, the current $i_{206}$ continues to decrease past zero (represented by a dotted line 410) with a corresponding increase in the current $i_{205}$ above the level of the load current (represented by a dotted line 420). Also, the cross-conduction causes a large voltage overshoot (represented by dotted line 430 in FIG. 4B) when the power switch FET 206 is finally turned off The voltage overshoot 430 can cause excessive power dissipation in the push-push converter 200 and cause permanent damage to the power switch FET 206. The corrective action is to advance the turn-off time of the power switch FET 206 relative to the drive signals of the power switch FET 222 to a point Z where the current $i_{206}$ just reaches zero. This timing shift eliminates the cross conduction and it reduces the peak of the voltage $v_{204}$ to an acceptable level as displayed by the solid line waveforms in FIGS. 4A–4E.

In the optimum partial-load drive timing in FIGS. 4A–4E is applied at full load conditions, then the power switch FET 206 turns off prematurely still carrying a substantial amount of current. This condition leads to excessive power dissipation in the power switch FET 206. Placing a low-loss diode (not shown in FIG. 2) in parallel with the power switch FET 206 is not an effective solution because the lead inductances prevent the current from shifting quickly from the power switch FET 206 to the diode. Furthermore, the additional junction capacitance introduced by this diode across the power switch FET 206 boosts the voltage overshoot 430.

Therefore, to achieve high efficiency and low voltage stresses on the control-driven synchronous rectifier power switch FETs 205, 206, it is necessary to shift the turn-off of the power switch FET 206 depending upon the load conditions imposed on the push-push converter 200. Likewise, an examination of an alternate switching transition (i.e. when the power switch FET 201 turns off) reveals a need to shift the turn-off of the power switch FET 205. However, in other converter designs the voltage stresses on the control-driven synchronous rectifier power switch FETs 205, 206 are uneven. In such circumstances, it is possible to shift the timing only of the power switch FET that experiences the higher stresses.

Figure 5A:
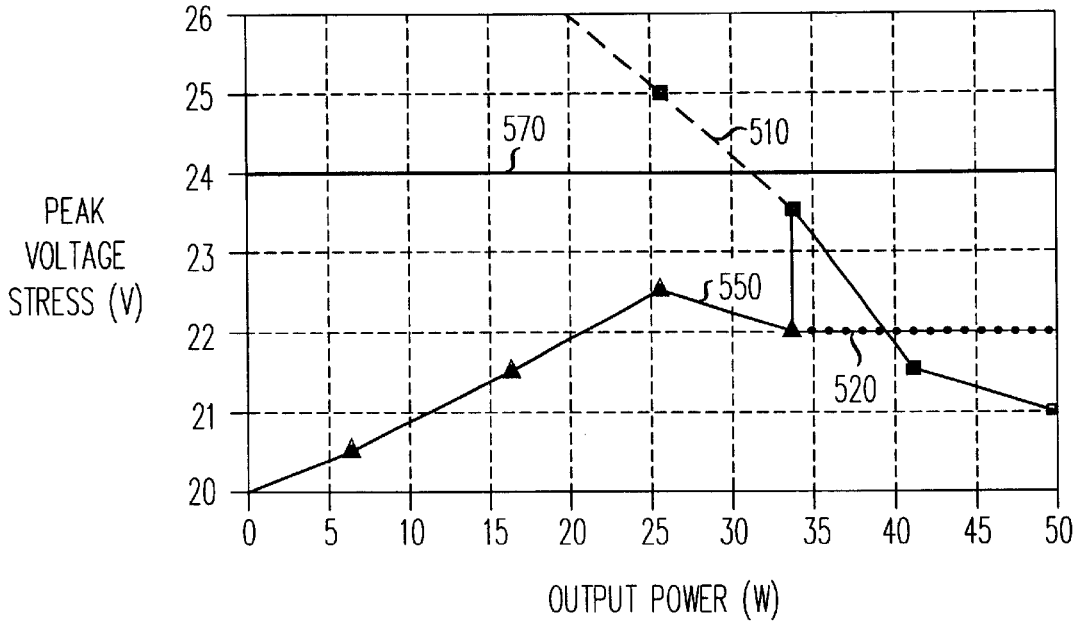
FIGS. 5A–5B, taken in conjunction, illustrate operational diagrams of a typical DC/DC power converter further representing the principles embodied in the present invention.
Figure 5B:
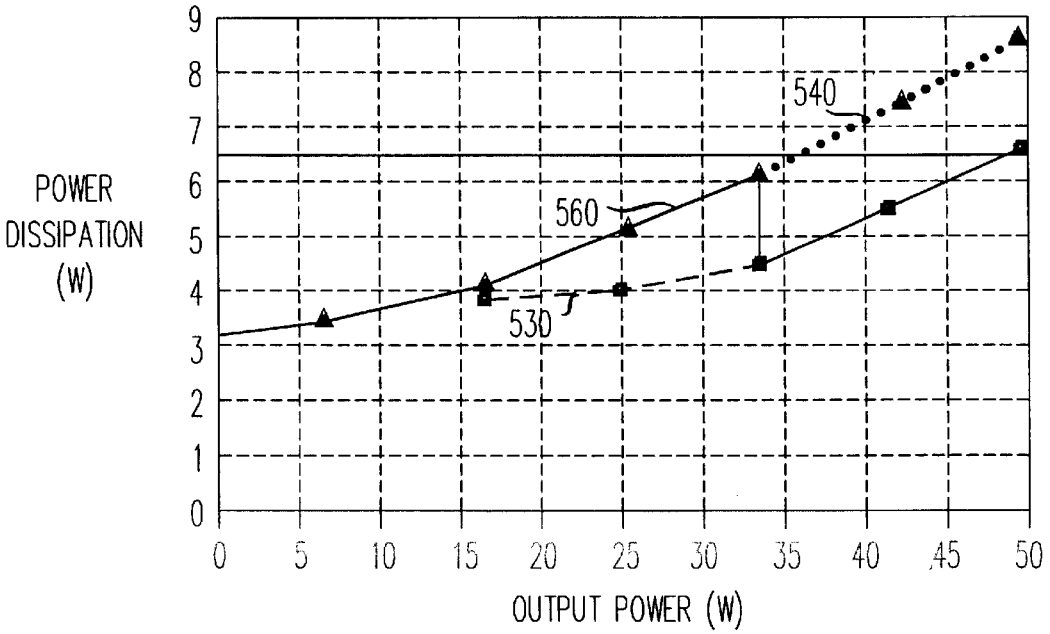

Turning now to FIGS. 5A–5B, illustrated, in conjunction, are operational diagrams of a typical DC/DC power converter (not shown) further representing the principles embodied in the present invention. In short, FIGS. 5A–5B show that no fixed set of delays produces satisfactory operation over the entire range of output power. FIG. 5A includes curves of the peak voltage stress on either synchronous rectifier power switch (not shown), while FIG. 5B contains curves of the power dissipation in the DC/DC power converter; both the peak voltage stress and the power dissipation are plotted against the DC/DC power converter output power.

A plurality of curves (illustrated as broken lines 510, 530 connecting a plurality of squares in FIGS. 5A, 5B, respectively), referred to as a full-load timing condition, correspond to one set of drive-timing delays; a plurality of curves (illustrated as dotted lines 520, 540 connecting a plurality of triangles in FIGS. 5A, 5B, respectively) referred to as no-load timing condition correspond to another set of drive-timing delays. A heavy set of lines 550, 560, in FIGS. 5A, 5B, respectively, represent the DC/DC power converter operation with a binary timing shift. The lines 550, 560 demonstrate the timing shift where the delays for the synchronous rectifier power switches are shifted at 33 W output power to the no-load timing condition 520, 540 for low power levels and to the full-load timing condition 510, 530 for high power levels in FIGS. 5A, 5B, respectively.

The no-load timing condition 520 of FIG. 5A shows that the peak voltage stresses on the synchronous rectifier power switches are satisfactory below a device upper limit line 570 over the entire range of the DC/DC power converter output power. However, it can be seen in FIG. 5B by the no-load timing condition 540 that power dissipation at high output power is excessive relative to the full-load condition 530. This excess dissipation is a result of a synchronous rectifier power switch turning off too early, while it is still carrying appreciable load current. The remedy is to delay the turn-off of one of the power switches thereby shifting to the full-load timing curves 510, 530 as illustrated in FIGS. 5A, 5B, respectively, where the maximum power dissipated in the DC/DC power converter is seen to drop by 2 Watts. Lower power dissipation is highly beneficial because it permits the DC/DC power converter to operate in more demanding thermal environments without exceeding the maximum allowable temperature of the internal components.

As demonstrated in FIG. 5B, the full-load timing condition 530 produces a lower power dissipation than the no-load timing condition 540 over a wide range of output power. However, FIG. 5A demonstrates that the resulting peak voltage stress on the synchronous rectifier power switches exceeds the limit for output power less than 30 W. The cause of the excessive stress is cross-conduction between synchronous rectifier power switches as previously discussed with respect to FIGS. 4B–4E. The cross conduction can be eliminated by advancing the turn-off of one of the power switches returning to the no-load timing condition 520.

The performance curves of FIGS. 5A–5B illustrate that neither set of time delays is suitable for the entire range of the DC/DC power converter output power. More specifically, the full-load timing condition 510, 530 is preferable at heavy loads to minimize the maximum power dissipated by the DC/DC power converter. However, the no-load timing condition 520, 540 is necessary at lighter loads to avoid excessive voltage stress on the synchronous rectifier power switches. One way of achieving satisfactory operation over the entire range of output power is to switch between these two sets of timing delays.

Figure 6:
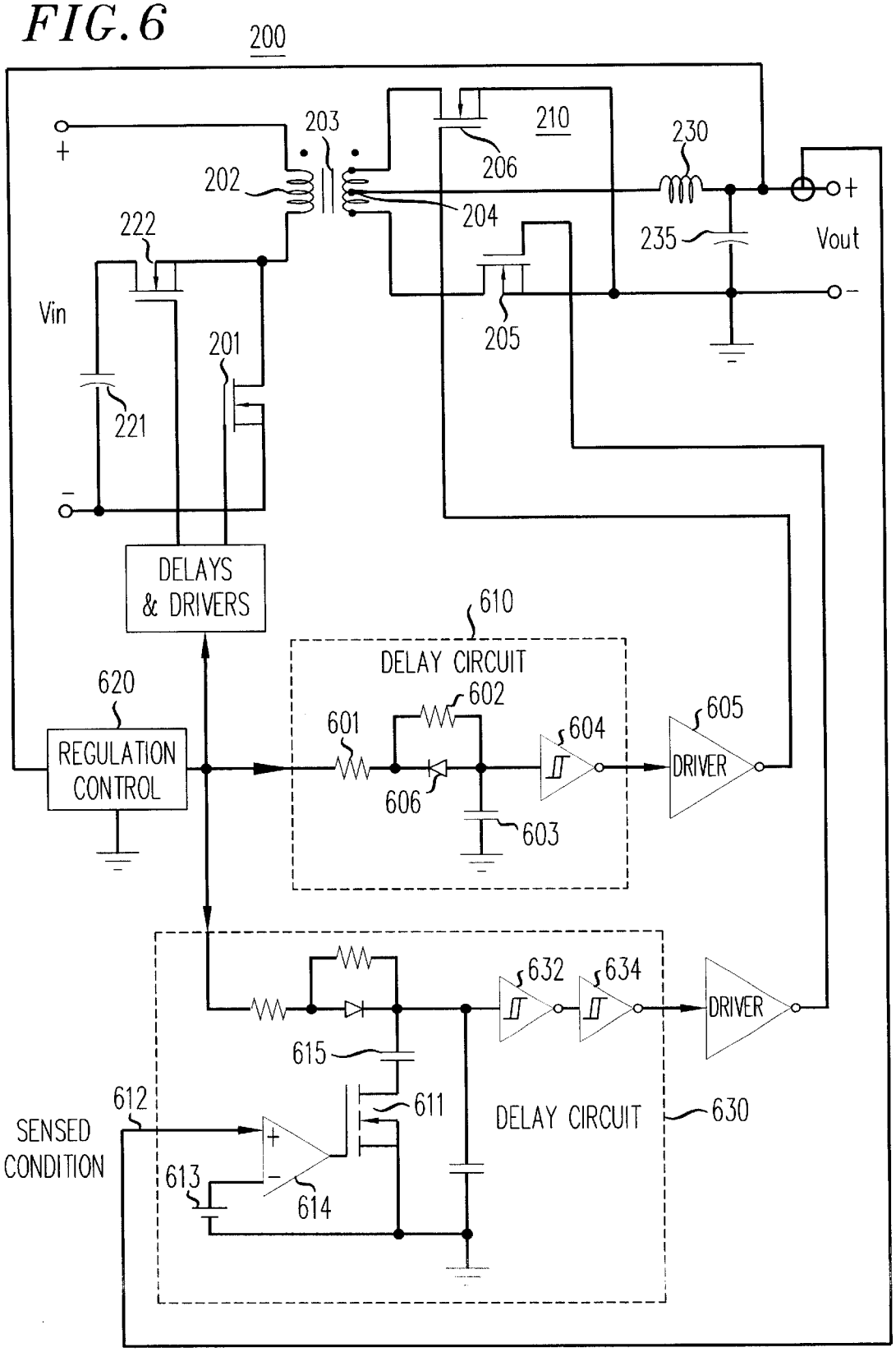
FIG. 6 illustrates a schematic diagram of the clamp-mode push-push DC/DC power converter with the control-driven synchronous rectifier of FIG. 2 employing an embodiment of a drive circuit of the present invention.

Turning now to FIG. 6, illustrated is a schematic diagram of the clamp-mode push-push DC/DC power converter 200 with the control-driven synchronous rectifier 210 of FIG. 2 employing an embodiment of a drive circuit of the present invention. A first load timing condition results when a FET 611 is closed; a second load timing condition results when the FET 611 is open.

Independent, fixed delays can be introduced for turn-on and turn-off of any power switch using a delay circuit 610. The delay circuit 610 is an alternative embodiment of a portion of the prior art control and drive circuit 220 of FIG. 2 and is included for comparison purposes. The delay circuit 610 comprises a pair of resistors 601, 602, a capacitor 603 and a diode 606 followed by an inverter 604 to restore the rapid transitions between states. At the rising edge of a pulse from a regulation control circuit 620, a current flows through the resistors 601, 602 to charge the capacitor 603. When the voltage across the capacitor 603 reaches the rising threshold of the inverter 604, the output of the inverter 604 switches from a high state to a low state. This signal is fed to a driver circuit 605; the driver circuit 605 inverts the transition to turn-on the power switch FET 205, thereby providing the proper operating voltage and current to the power switch FET 205.

At the falling edge of the pulse from the regulation control circuit 620, the capacitor 603 discharges through the diode 606 and the resistor 601 with a shorter time constant than the corresponding charging interval. When the voltage across the capacitor 603 reaches the falling threshold of the inverter 604, the output of the inverter 604 switches from the low state to the high state causing the power switch FET 205 to turn-off. Increasing the value of the resistor 601 lengthens both the turn-on and turn-off delays; however, increasing the value of the resistor 602 lengthens only the turn-on delay significantly. In some cases, it may be necessary to reverse the diode 606 to permit independent shortening of the turn-on delay or lengthening the turn-off delay without affecting the other. In other cases, acceptable delays may be obtained by replacing the diode 606 and the resistor 602 with a short circuit giving up independent control of the two delays.

A delay circuit 630, incorporating the principles of the present invention, with a variable delay operates in a similar manner to that of the delay circuit 610 when the FET 611 is open. However, the delay circuit 630 further comprises two inverters 632, 634 to induce the power switch FET 206 to be on when the power switch FET 205 is off. In the delay circuit 630, the turn-on and turn-off delays are switched in a binary fashion in response to a voltage signal present at a lead 612 representing a load current or some other push-push converter 200 operating condition. If the load current is chosen as the controlling variable possible sources of this signal include a current-sense transformer or a precision resistor in the load-current path. When the load current signal exceeds a reference voltage 613, the output of a comparator 614 changes from a low state to a high state thereby closing the FET 611. A capacitor 615 is appended to the timing network to increase the time constants thereby lengthening the delays for both the turn-on and turn-off of the power switch FET 206. In the illustrated embodiment, only the turn-off time of the power switch FET 206 has a major effect on the performance described above, but to keep the delay circuit *630* uncomplicated, the turn-on time is permitted to shift as well. When the load current signal later falls below the reference voltage 613, the capacitor 615 is removed from the timing network and the delays are shortened to their original values.

Figure 7:
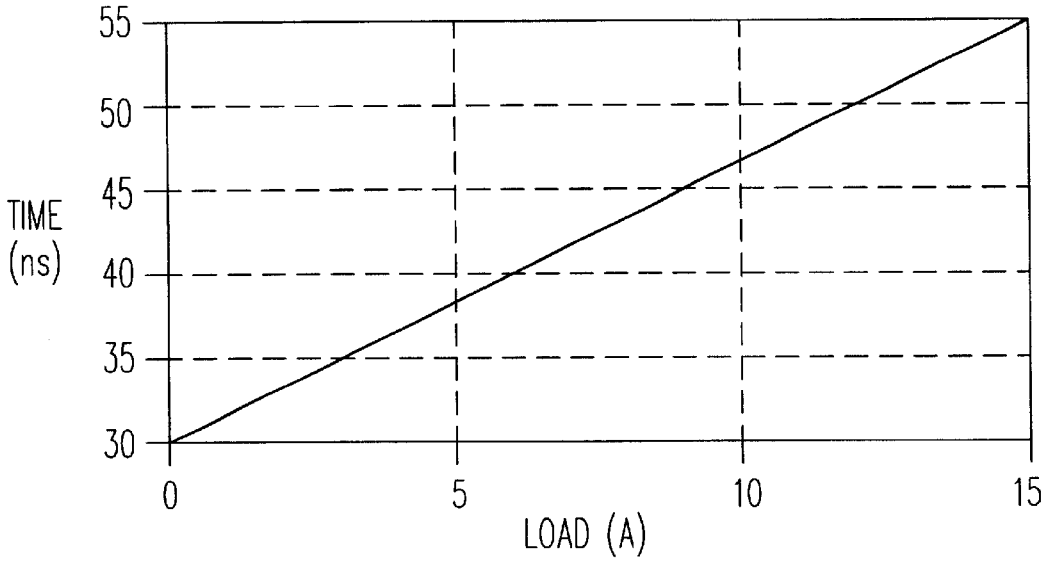
FIG. 7 illustrates a graphical representation of the operation of the control-driven synchronous rectifier power switch FETs of FIG. 2.

Turning now to FIG. 7, illustrated is a graphical representation of the operation of the control-driven synchronous rectifier power switch FETs 205, 206 of FIG. 2. More specifically, FIG. 7 demonstrates the turn-off time of the power switch FET 206 as a function load (in amperes) relative to turn-off of the power switch FET 222. To augment the operation of the present invention, it is possible to accommodate a drive circuit (not shown) with a continuously varying delay as a function of the optimum drive timing of the individual power switch FETs 205, 206. The illustrated embodiment demonstrates that optimum drive timing for the power switch FET 206; however, the power switch FET 205 has an analogous set of curves to optimize its drive timing to ensure that each synchronous rectifier [switch] *power switch FET* 205, 206 is turned on for exactly the amount of time that the switch conducts positive current.

Figure 8:
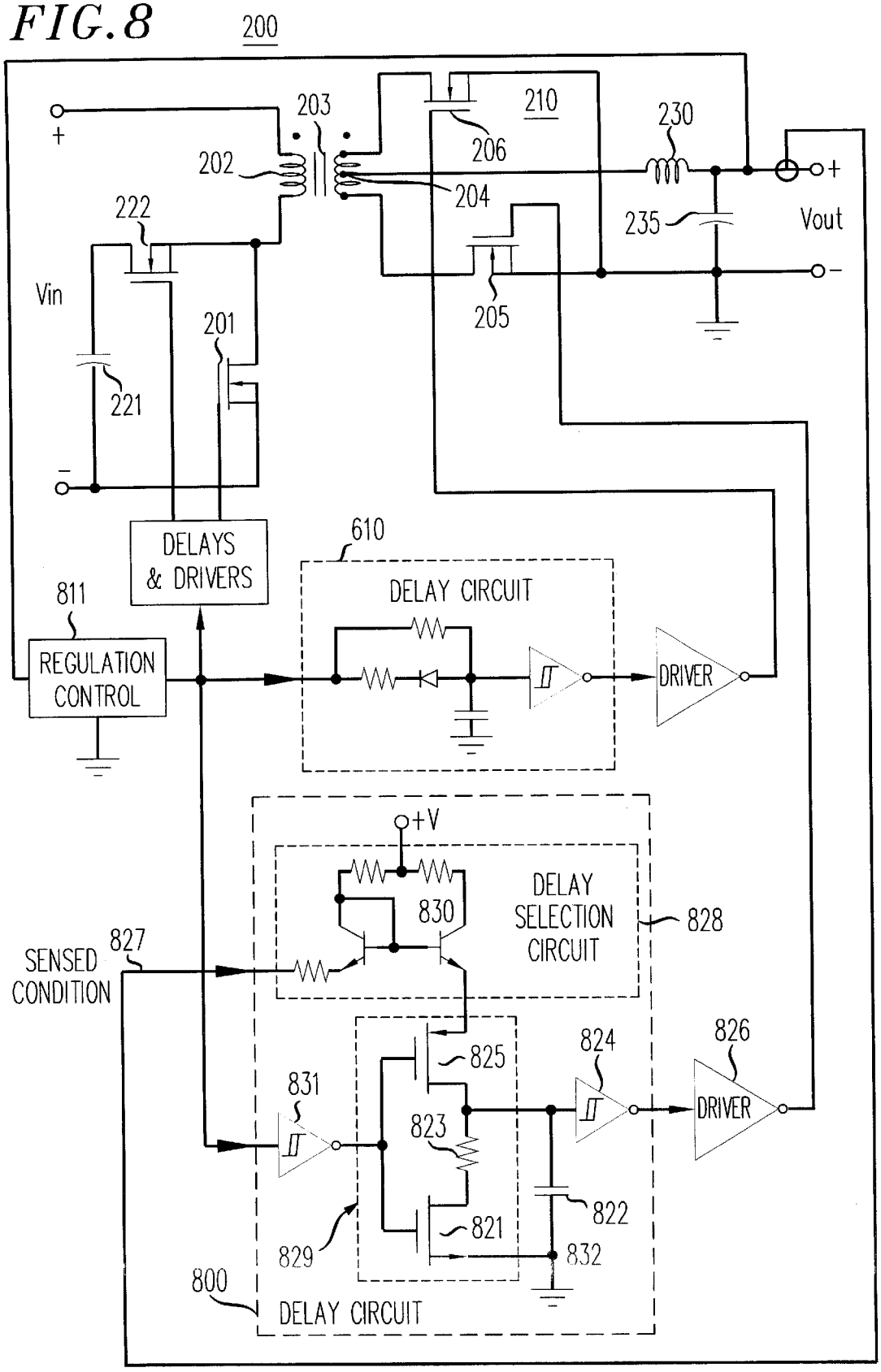
FIG. 8 illustrates a schematic diagram of the clamp-mode push-push DC/DC power converter with the control-driven synchronous rectifier of FIG. 2 employing an alternative embodiment of a drive circuit of the present invention.

Turning now to FIG. 8, illustrated is a schematic diagram of the clamp-mode push-push DC/DC power converter 200 with the control-driven synchronous rectifier 210 of FIG. 2 employing an alternative embodiment of a drive circuit of the present invention. The binary timing shift illustrated with respect to FIGS. 5, 6 produces a vast improvement over the prior art control-driven synchronous rectifier circuits. However, maximum efficiency and minimum voltage stress on the control-driven synchronous rectifier *power* switch FETs 205, 206 can be more readily achieved at all load levels by continuously varying the turn-off time of the power switch FET 206 in accordance with the graphical representation as set forth in FIG. 7. Therefore, the illustrated embodiment incorporates a delay circuit 800 with a continuously variable delay into the push-push converter 200. The delay circuit 610, described with respect to FIG. 6, is illustrated again for comparison purposes.

A delay control signal 827, proportional to the load current, establishes a current flow in a transistor 830 of a current mirror 828. The current mirror 828 acts as a controlled current source thereby feeding a totem pole inverter 829. At a rising edge of a pulse from a regulation control circuit 811 that passes through an inverter 831, a FET 825 turns on thereby permitting the output current of the current mirror 828 to charge a timing capacitor 822 at a rate determined by the control signal level. When the voltage across the capacitor 822 reaches the rising threshold of an inverter 824, the output of the inverter 824 shifts from a high state to a low state. The resulting signal is then fed to a drive circuit 826 that turns off the power switch FET 206. When the delay control signal level is higher relative to the ground reference node 832, the capacitor 822 charges at a slower rate and the turn-off of the power switch FET 206 is more delayed.

At the falling edge of the pulse from the regulation circuit 811 through the inverter 831, a FET 821 turns on thereby discharging the capacitor 822 through a resistor 823 with a fixed time constant. When the voltage across the capacitor 822 reaches the falling threshold of the inverter 824, the output of the inverter 824 transitions from a low state to a high state. The resulting signal is then fed to the driver circuit 826, thereby turning on the power switch FET 206 with a fixed delay.

One of ordinary skill in the art will understand that the delay circuits 630, 800 illustrated in FIGS. 6, 8 are alternate embodiments employing the principles of the present invention. Additional embodiments employing the general concept of a drive circuit with variable drive timing delay as a function of a given power converter operating condition are also well within the scope of the present invention.

Although the present invention has been described in detail, those skilled in the art should understand that they can make various changes, substitutions and alterations to the invention described herein without departing from the spirit and scope of the invention in its broadest form.

What is claimed is:

1. A drive circuit for a converter, said converter including an inverter and a synchronous rectifier, said drive circuit comprising:

a modulation circuit for generating a drive waveform for controlling said inverter and said synchronous rectifier employing a negative feedback loop;

a modification circuit, coupled to said modulation circuit, for sending an operating condition of said converter and shifting a portion of said drive waveform as a function of said operating condition, said modification circuit thereby creating a variable drive waveform from said drive waveform without employing negative feedback; and a transmission circuit, coupled to said modification circuit, for applying said variable drive waveform to said converter, thereby allowing a variable nonconcurrent change in state of said inverter and said synchronous rectifier according to said function of said operating condition.

2. The drive circuit as recited in claim 1 wherein said modification circuit delays said portion of said waveform to produce said variable drive waveform.

3. The drive circuit as recited in claim 1 wherein said operating condition is an output current level of said converter.

4. The drive circuit as recited in claim 1 further comprising another transmission circuit and wherein said modification circuit creates a nonvariable drive waveform, said another transmission circuit applying said nonvariable drive waveform to said inverter and said transmission circuit applying said variable drive waveform to said synchronous rectifier.

5. The drive circuit as recited in claim 1 wherein said modification circuit comprises a plurality of delay circuits having different delays associated therewith and a delay selection circuit adapted to act on a selected one of said plurality of delay circuits to create said variable drive waveform.

6. The drive circuit as recited in claim 1 wherein said modification circuit increases a delay of said portion of said drive waveform as an output current level of said converter increases.

7. The drive circuit as recited in claim 1 wherein said drive waveform is adapted to cause a switching component within said synchronous rectifier to transition from a conducting to a nonconducting state.

8. The drive circuit as recited in claim 1 wherein said function of said operating condition is discontinuous.

9. The drive circuit as recited in claim 1 wherein said converter comprises an isolation transformer coupled between said inverter and said synchronous rectifier, said converter being an isolated, buck-derived converter.

10. The drive circuit as recited in claim 1 wherein said modification circuit comprises an RC circuit having a variable time constant associated therewith.

11. A method of driving a converter, said converter including an inverter and a synchronous rectifier, said method comprising the steps of:

generating a drive waveform for controlling said inverter and said synchronous rectifier employing a negative feedback loop;

sensing an operating condition of said converter and shifting a portion of said drive waveform as a function of said operating condition, thereby creating a variable drive waveform from said drive waveform without employing negative feedback; and applying said variable drive waveform to said converter, thereby allowing a variable nonconcurrent change in state of said inverter and said synchronous rectifier according to said function of said operating condition.

12. The method as recited in claim 11 wherein said step of sensing and shifting comprises the step of delaying said portion of said drive waveform to produce said variable drive waveform.

13. The method as recited in claim 11 wherein said operating condition is an output current level of said converter.

14. The method as recited in claim 11 wherein said step of applying further comprises the steps of:

applying a nonvariable drive waveform to said inverter; and applying said variable drive waveform to said synchronous rectifier.

15. The method as recited in claim 11 wherein said step of sensing and shifting comprises the step of acting on a selected one of a plurality of delay circuits to create said variable drive waveform.

16. The method as recited in claim 11 wherein said step of sensing and shifting comprises the step of increasing a delay of said portion of said drive waveform as an output current level of said converter increases.

17. The method as recited in claim 11 wherein said step of applying causes a switching component within said synchronous rectifier to transition from a conducting to a nonconducting state.

18. The method as recited in claim 11 wherein said function of said operating condition is discontinuous.

19. The method as recited in claim 11 wherein said converter comprises an isolation transformer coupled between said inverter and said synchronous rectifier, said converter being an isolated, buck-derived converter.

20. The method as recited in claim 11 wherein said step of sensing and shifting is performed by a modification circuit including an RC circuit having a variable time constant associated therewith.

21. A drive circuit for isolated, buck-derived converter, said converter including an inverter, a synchronous rectifier and an isolation transformer coupled between said inverter and said synchronous rectifier, said drive circuit comprising:

a modulation circuit for generating a drive waveform for controlling said inverter and said synchronous rectifier employing a negative feedback loop;

a modification circuit, coupled to said modulation circuit, for sensing an output current level of said converter and delaying a portion of said drive waveform as a function of said output current level, said waveform modification circuit thereby creating a fixed and a variable drive waveform from said drive waveform without employing negative feedback; and a first and second transmission circuit, coupled to said modification circuit, for applying said fixed drive waveform to said inverter and said variable drive waveform to said synchronous rectifier, thereby allowing a variable change of state of said synchronous rectifier to lag a change of state of said inverter according to said function of said output current level.

22. The drive circuit as recited in claim 21 wherein said modification circuit comprises a plurality of delay circuits having different delays associated therewith and a delay selection circuit adapted to act on a selected one of said plurality of delay circuits to create said variable drive waveform.

23. The drive circuit as recited in claim 21 wherein said modification circuit increases a delay of said portion of said drive waveform as an output current level of said converter increases.

24. The drive circuit as recited in claim 21 wherein said drive waveform is adapted to cause a switching component within said synchronous rectifier to transition from a conducting to a nonconducting state.

25. The drive circuit as recited in claim 21 wherein said function of said operating condition is discontinuous.

26. The drive circuit as recited in claim 21 wherein said modification circuit comprises an RC circuit having a variable time constant associated therewith.

*27. For use with a DC-DC converter including an isolation transformer having a primary winding coupled to an input of said converter and a secondary winding coupled to an output of said converter, said converter further including an inverter interposed between said input and said primary winding and a synchronous rectifier, interposed between said secondary winding and said output, having first and second switches, a circuit coupled to and configured to control said inverter and said synchronous rectifier, comprising:*

*a modulation circuit configured to generate an inverter drive waveform for controlling said inverter to regulate an output characteristic of said converter; and*

*a modification circuit configured to advance a synchronous rectifier drive waveform for at least one of said first and second switches of said synchronous rectifier relative to said inverter drive waveform for said inverter as said converter transitions from a substantially full load operating condition to a partial load operating condition.*

*28. The circuit as recited in claim 27 further comprising a transmission circuit configured to apply said inverter and synchronous rectifier drive waveforms to said inverter and said first and second switches of said synchronous rectifier, respectively.*

*29. The circuit as recited in claim 27 wherein said converter further comprises an active clamp interposed between said input and said primary winding.*

*30. The circuit as recited in claim 27 wherein said modification circuit comprises a timing network.*

*31. The circuit as recited in claim 30 wherein said modification circuit further comprises a comparator and a controllable switch appended to said timing network and configured to vary a time constant associated therewith.*

*32. The circuit as recited in claim 27 wherein said modification circuit is configured to continuously and variably advance said synchronous rectifier drive waveform for said at least one of said first and second switches of said synchronous rectifier.*

*33. The circuit as recited in claim 27 wherein said converter is a buck-derived converter employing a topology selected from the group consisting of:*

*a forward topology,*

*a flyback topology,*

*a push-pull topology, and*

*a bridge topology.*

*34. For use with a DC-DC converter including an isolation transformer having a primary winding coupled to an input of said converter and a secondary winding coupled to an output of said converter, said converter further including an inverter interposed between said input and said primary winding and a synchronous rectifier, interposed between said secondary winding and said output, having first and second switches, a method for controlling said inverter and said synchronous rectifier, comprising:*

*generating an inverter drive waveform for controlling said inverter to regulate an output characteristic of said converter; and*

*advancing a synchronous rectifier drive waveform for at least one of said first and second switches of said synchronous rectifier relative to said inverter drive waveform for said inverter as said converter transitions from a substantially full load operating condition to a partial load operating condition.*

*35. The method as recited in claim 34 further comprising applying said inverter and synchronous rectifier drive waveforms to said inverter and said first and second switches of said synchronous rectifier, respectively.*

*36. The method as recited in claim 34 wherein said converter further comprises an active clamp interposed between said input and said primary winding.*

*37. The method as recited in claim 34 wherein said advancing is performed by a modification circuit comprising a timing network.*

*38. The method as recited in claim 37 wherein said modification circuit further comprises a comparator and a controllable switch appended to said timing network and configured to vary a time constant associated therewith.*

*39. The method as recited in claim 34 wherein said advancing is continuously variable.*

*40. The method as recited in claim 34 wherein said converter is a buck-derived converter employing a topology selected from the group consisting of:*

*a forward topology;*

*a flyback topology,*

*a push-pull topology, and*

*a bridge topology.*

*41. A DC-DC converter having an input and output, comprising:*

*an isolation transformer having a primary winding and a secondary winding;*

*an inverter interposed between said input and said primary winding;*

*a synchronous rectifier, interposed between said secondary winding and said output, having first and second switches; and*

*a circuit coupled to and configured to control said inverter and said synchronous rectifier, including:*

*a modulation circuit configured to generate an inverter drive waveform for controlling said inverter to regulate an output characteristic of said converter, and*

*a modification circuit configured to advance a synchronous rectifier drive waveform for at least one of said first and second switches of said synchronous rectifier relative to said inverter drive waveform for said inverter as said converter transitions from a substantially full load operating condition to a partial load operating condition.*

*42. The converter as recited in claim 41 wherein said circuit further comprises a transmission circuit configured to apply said inverter and synchronous rectifier drive waveforms to said inverter and said first and second switches of said synchronous rectifier, respectively.*

*43. The converter as recited in claim 41 further comprising an active clamp interposed between said input and said primary winding.*

*44. The converter as recited in claim 41 wherein said modification circuit comprises a timing network.*

*45. The converter as recited in claim 44 wherein said modification circuit further comprises a comparator and a controllable switch appended to said timing network and configured to vary a time constant associated therewith.*

*46. The converter as recited in claim 41 wherein said modification circuit is configured to continuously and variably advance said synchronously rectifier drive waveform for said at least one of said first and second switches of said synchronous rectifier.*

*47. The converter as recited in claim 41 wherein said converter is a buck-derived converter employing a topology selected from the group consisting of:*

*a forward topology,*

*a flyback topology,*

*a push-pull topology, and*

*a bridge topology.*

*48. For use with a DC-DC converter including an isolation transformer having a primary winding coupled to an input of said converter and a secondary winding coupled to an output of said converter, said converter further including an inverter interposed between said input and said primary winding and a synchronous rectifier, interposed between said secondary winding and said output, having first and second switches, a circuit coupled to and configured to control said inverter and said synchronous rectifier, comprising:*

*a modulation circuit configured to generate inverter and synchronous rectifier drive waveforms for controlling said inverter and said first and second switches of said synchronous rectifier, respectively; and*

*a modification circuit configured to vary said synchronous rectifier drive waveform for at least one of said first and second switches of said synchronous rectifier relative to said inverter drive waveform for said inverter as a function of an operating condition of said converter.*

*49. The circuit as recited in claim 48 further comprising a transmission circuit configured to apply said inverter and synchronous rectifier drive waveforms to said inverter and said first and second switches of said synchronous rectifier, respectively.*

*50. The circuit as recited in claim 48 wherein said converter further comprises an active clamp interposed between said input and said primary winding.*

*51. The circuit as recited in claim 48 wherein said modification circuit comprises a timing network.*

*52. The circuit as recited in claim 51 wherein said modification circuit further comprises a comparator and a controllable switch, appended to said timing network, configured to vary a time constant associated therewith.*

*53. The circuit as recited in claim 48 wherein said modification circuit is configured to continuously vary said synchronous rectifier drive waveform for said at least one of said first and second switches of said synchronous rectifier, respectively.*

*54. The circuit as recited in claim 48 wherein said converter is a buck-derived converter employing a topology selected from the group consisting of:*

*a forward topology,*

*a flyback topology,*

*a push-pull topology, and*

*a bridge topology.*

*55. For use with a DC-DC converter including an isolation transformer having a primary winding coupled to an input of said converter and a secondary winding coupled to an output of said converter, said converter further including an inverter interposed between said input and said primary winding and a synchronous rectifier, interposed between said secondary winding and said output, having first and second switches, a method for controlling said inverter and said synchronous rectifier, comprising:*

*generating inverter and synchronous rectifier drive waveforms for controlling said inverter and said first and second switches of said synchronous rectifier, respectively; and*

*varying said synchronous rectifier drive waveform for at least one of said first and second switches of said synchronous rectifier relative to said inverter drive waveform for said inverter as a function of an operating condition of said converter.*

*56. The method as recited in claim 55 further comprising applying said inverter and synchronous rectifier drive waveforms to said inverter and said first and second switches of said synchronous rectifier, respectively.*

*57. The method as recited in claim 55 wherein said converter further comprises an active clamp interposed between said input and said primary winding.*

*58. The method as recited in claim 55 wherein said varying is performed by a modification circuit comprising a timing network.*

*59. The method as recited in claim 57 wherein said modification circuit further comprises a comparator and a controllable switch, appended to said timing network, configured to vary a time constant associated therewith.*

*60. The method as recited in claim 55 wherein said varying is continuous.*

*61. The method as recited in claim 55 wherein said converter is a buck-derived converter employing a topology selected from the group consisting of:*

*a forward topology,*

*a flyback topology,*

*a push-pull topology, and*

*a bridge topology.*

*62. A DC-DC converter having an input and output, comprising:*

*an isolation transformer having a primary winding and a secondary winding;*

*an inverter interposed between said input and said primary winding;*

*a synchronous rectifier, interposed between said secondary winding and said output, having first and second switches; and*

*a circuit coupled to and configured to control said inverter and said synchronous rectifier, including:*

*a modulation circuit configured to generate inverter and synchronous rectifier drive waveforms for controlling said inverter and said first and second switches of said synchronous rectifier, respectively, and*

*a modification circuit configured to vary said synchronous rectifier drive waveform for at least one of said first second switches of said synchronous rectifier relative to said inverter drive waveform for said inverter as a function of an operating condition of said converter.*

*63. The converter as recited in claim 62 wherein said circuit further comprises a transmission circuit configured to apply said inverter and synchronous rectifier drive waveforms to said inverter and said first and second switches of said synchronous rectifier, respectively.*

*64. The converter as recited in claim 62 further comprising an active clamp interposed between said input and said primary winding.*

*65. The converter as recited in claim 62 wherein said modification circuit comprises a timing network.*

*66. The converter as recited in claim 65 wherein said modification circuit further comprises a comparator and a controllable switch, appended to said timing network, configured to vary a time constant associated therewith.*

*67. The converter as recited in claim 62 wherein said modification circuit is configured to continuously vary said synchronous rectifier drive waveform for said at least one of said first and second switches of said synchronous rectifier.*

*68. The converter as recited in claim 62 wherein said converter is a buck-derived converter employing a topology selected from the group consisting of:*

*a forward topology,*

*a flyback topology,*

*a push-pull topology, and*

*a bridge topology.*

*69. For use with a DC-DC converter including an isolation transformer having a primary winding coupled to an input of said converter and a secondary winding coupled to an output of said converter, said converter further including an inverter interposed between said input and said primary winding and a synchronous rectifier, interposed between said secondary winding and said output, having first and second switches, a circuit coupled to and configured to control said inverter and said synchronous rectifier, comprising:*

*a modulation circuit configured to generate drive waveforms for controlling said inverter and said first and second switches of said synchronous rectifier, respectively; and*

*a modification circuit, including:*

*an inverter modification sub-circuit configured to develop an inverter drive waveform for said inverter as a function of said drive waveform and an operating condition of the converter,*

*a first synchronous rectifier modification sub-circuit configured to develop a first synchronous rectifier drive waveform for said first switch of said synchronous rectifier as a function of said drive waveform and said operating condition of said converter,*

*a second synchronous rectifier sub-circuit configured to develop a second synchronous rectifier drive waveform for said second switch of said synchronous rectifier as a function of said drive waveform and said operating condition of said converter, at least one of said first and second synchronous rectifier drive waveforms varying from said inverter drive waveform.*

*70. The circuit as recited in claim 69 further comprising a transmission circuit, including:*

*an inverter transmission sub-circuit, coupled to said inverter modification sub-circuit, configured to apply said inverter drive waveform to said inverter;*

*an first synchronous rectifier transmission sub-circuit, coupled to said first synchronous rectifier modification sub-circuit, configured to apply said first synchronous rectifier drive waveform to said first switch of said synchronous rectifier; and*

*a second synchronous rectifier transmission sub-circuit, coupled to said second synchronous rectifier modification sub-circuit, configured to apply said second synchronous rectifier drive waveform to said second switch of said synchronous rectifier.*

*71. The circuit as recited in claim 69 wherein said converter further comprises an active clamp interposed between said input and said primary winding.*

*72. The circuit as recited in claim 69 wherein at least one of said inverter modification sub-circuit, said first synchronous rectifier modification sub-circuit and said second synchronous rectifier modification sub-circuit comprise a timing network.*

*73. The circuit as recited in claim 72 wherein said at least one of said inverter modification sub-circuit, said first synchronous rectifier modification sub-circuit and said second synchronous rectifier modification sub-circuit further comprise a comparator and a controllable switch, appended to said timing network, configured to vary a time constant associated therewith.*

*74. The circuit as recited in claim 69 wherein said at least one of said first and second synchronous rectifier drive waveforms continuously vary from said inverter drive waveform.*

*75. The circuit as recited in claim 69 wherein said converter is a buck-derived converter employing a topology selected from the group consisting of:*

*a forward topology,*

*a flyback topology,*

*a push-pull topology, and*

*a bridge topology.*

*76. For use with a DC-DC converter including an isolation transformer having a primary winding coupled to an input of said converter and a secondary winding coupled to an output of said converter, said converter further including an inverter interposed between said input and said primary winding and a synchronous rectifier, interposed between said secondary winding and said output, having first and second switches, a method for controlling said inverter and said synchronous rectifier, comprising:*

*generating drive waveforms for controlling said inverter and said first and second switches of said synchronous rectifier; and*

*developing an inverter drive waveform, a first synchronous rectifier drive waveform and a second synchronous rectifier drive waveform for said inverter, said first switch of said synchronous rectifier and said second switch of said synchronous rectifier, respectively, as a function of said drive waveform and an operating condition of the converter, at least one of said first and second synchronous rectifier drive waveforms varying from said inverter drive waveform.*

*77. The method as recited in claim 76 further comprising applying said inverter drive waveform, said first synchronous rectifier drive waveform and said second synchronous rectifier drive waveform to said inverter, said first switch of said synchronous rectifier and said second switch of said synchronous rectifier, respectively.*

*78. The method as recited in claim 76 wherein said converter further comprises an active clamp interposed between said input and said primary winding.*

*79. The method as recited in claim 76 wherein said developing said inverter drive waveform, said first synchronous rectifier drive waveform and said second synchronous rectifier drive waveform are performed by an inverter modification sub-circuit, a first synchronous rectifier modification sub-circuit and a second synchronous rectifier modification sub-circuit, respectively, and at least one of said inverter modification sub-circuit, said first synchronous rectifier modification sub-circuit and said second synchronous rectifier modification sub-circuit comprise a timing network.*

*80. The method as recited in claim 79 wherein said at least one of said inverter modification sub-circuit, said first synchronous rectifier modification sub-circuit and said second synchronous rectifier modification sub-circuit further comprise a comparator and a controllable switch, appended to said timing network, configured to vary a time constant associated therewith.*

*81. The method as recited in claim 76 wherein said at least one of said first and second synchronous rectifier drive waveforms vary continuously.*

*82. The method as recited in claim 76 wherein said converter is a buck-derived converter employing a topology selected from the group consisting of:*

*a forward topology,*

*a flyback topology,*

*a push-pull topology, and*

*a bridge topology.*

*83. A DC-DC converter having an input and an output comprising:*

*an isolation transformer having a primary winding and a secondary winding;*

*an inverter interposed between said input and said primary winding;*

*a synchronous rectifier, interposed between said secondary winding and said output, having first and second switches; and*

*a circuit coupled to and configured to control said inverter and said synchronous rectifier, including:*

*a modulation circuit configured to generate drive waveforms for controlling said inverter and said first and second switches of said synchronous rectifier, and*

*a modification circuit, including:*

*an inverter modification sub-circuit configured to develop an inverter drive waveform for said inverter as a function of said drive waveform and an operating condition of the converter,*

*a first synchronous rectifier modification sub-circuit configured to develop a first synchronous rectifier drive waveform for said first switch of said synchronous rectifier as a function of said drive waveform and said operating condition of said converter, and*

*a second synchronous rectifier modification sub-circuit configured to develop a second synchronous rectifier drive waveform for said second switch of said synchronous rectifier as a function of said drive waveform and said operating condition of said converter, at least one of said first and second synchronous rectifier drive waveforms varying from said inverter drive waveform.*

*84. The converter as recited in claim 83 wherein said circuit further comprises a transmission circuit, including:*

*an inverter transmission sub-circuit, coupled to said inverter modification sub-circuit, configured to apply said inverter drive waveform to said inverter;*

*an first synchronous rectifier transmission sub-circuit, coupled to said first synchronous rectifier modification sub-circuit, configured to apply said first synchronous rectifier drive waveform to said first switch of said synchronous rectifier; and*

*a second synchronous rectifier transmission sub-circuit, coupled to said second synchronous rectifier modification sub-circuit, configured to apply said second synchronous rectifier drive waveform to said second switch of said synchronous rectifier.*

*85. The converter as recited in claim 83 further comprising an active clamp interposed between said input and said primary winding.*

*86. The converter as recited in claim 83 wherein at least one of said inverter modification sub-circuit, said first synchronous rectifier modification sub-circuit and said second synchronous rectifier modification sub-circuit comprise a timing network.*

*87. The converter as recited in claim 86 wherein at least one of said inverter modification sub-circuit, said first synchronous rectifier modification sub-circuit and said second synchronous rectifier modification sub-circuit further comprise a comparator and a controllable switch, appended to said timing network, configured to vary a time constant associated therewith.*

*88. The converter as recited in claim 83 wherein said at least one of said first and second synchronous rectifier drive waveforms continuously vary from said inverter drive waveform.*

*89. The converter as recited in claim 83 wherein said converter is a buck-derived converter employing a topology selected from the group consisting of:*

*a forward topology,*

*a flyback topology,*

*a push-pull topology, and*

*a bridge topology.*

* * * * *